J. RENNER.
FRYING DEVICE.
APPLICATION FILED JULY 2, 1908.

913,431.

Patented Feb. 23, 1909.

WITNESSES

INVENTOR
Jacob Renner
BY
ATTORNEYS

UNITED STATES PATENT OFFICE.

JACOB RENNER, OF ROCKWELL CITY, IOWA.

FRYING DEVICE.

No. 913,431.  Specification of Letters Patent.  Patented Feb. 23, 1909.

Application filed July 2, 1908. Serial No. 441,536.

*To all whom it may concern:*

Be it known that I, JACOB RENNER, a citizen of the United States, and a resident of Rockwell City, in the county of Calhoun and State of Iowa, have invented a new and Improved Frying Device, of which the following is a full, clear, and exact description.

My invention relates to cooking utensils and it has for its object to provide a frying device which will prevent the grease from becoming scattered over the kitchen floor; one which can be constructed at little expense and one which is economical in use.

In this specification I will describe the preferred form of my invention, but I do not limit myself thereto as I consider myself entitled to all forms and embodiments of the invention which may be held to fall within the scope of the appended claims.

Reference is to be had to the accompanying drawings, forming a part of this specification, in which similar characters of reference indicate corresponding parts in both the figures, in which—

Figure 1:
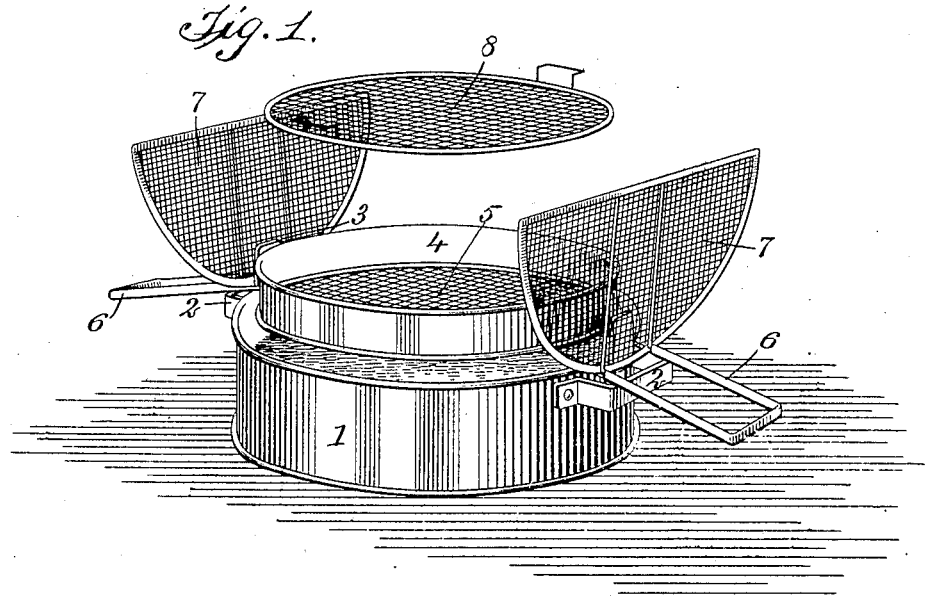
Figure 2:
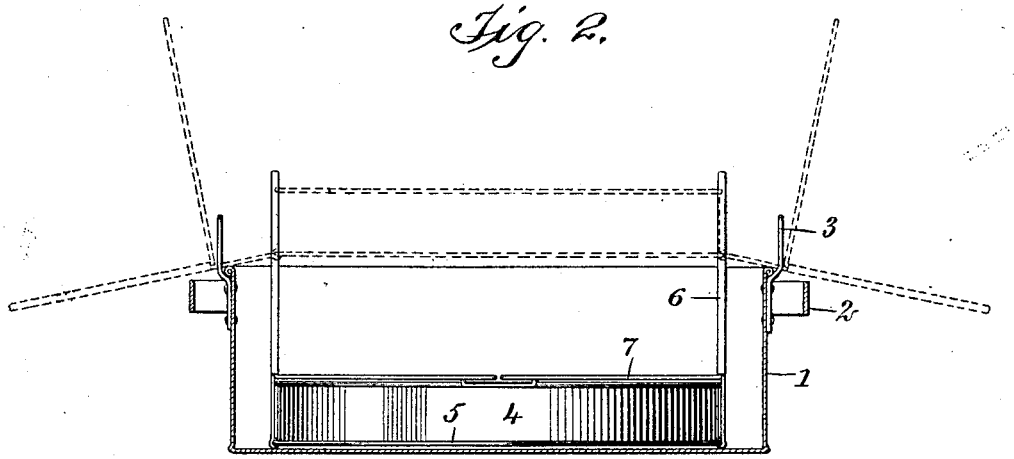

Figure 1 is a perspective view of the invention with the fryer suspended above the pan and an inner bottom suspended above the fryer; and Fig. 2 is a side elevation of the invention, the pan being shown in section.

By referring to the drawings, it will be seen that a pan 1 is provided with lateral handles or members 2 and with perpendicular handles or members 3, these being disposed at opposite sides of the pan 1. The periphery of a fryer 4 conforms with the walls of the interior of the pan 1, so that the fryer may be readily deposited at the bottom of the pan, or be removed altogether from the pan, as may be desired. The bottom of the fryer 4 is composed of a wire netting 5.

Pivoted to the lower rim of the fryer 4 are oppositely disposed handles 6, each of these handles 6 having an opening therein in which may be disposed one of the perpendicularly disposed handles or member 3 on the pan 1.

At a distance from the lower terminals of the handles 6, which corresponds with the height of the fryer 4, are disposed wire net covers 7, these wire net covers 7, being secured at right-angles to the handles 6, so that when the handles are upwardly disposed, the net covers 7 will be disposed over the fryer 4 to act as covers therefor.

Inner bottoms 8 are provided, these inner bottoms being adapted to be inserted in the fryer 4 and to rest on its wire bottom, the inner bottoms serving to enable the cook to remove the contents of the fryer without lifting the fryer from its suspended position over the pan 1, and these inner bottoms 8 may also be used when desired, to dispose the food which is to be fried, at a proper distance above the bottom of the pan 1.

In using my invention, lard, or other suitable grease is deposited in the pan 1, and the pan 1 is then placed upon the stove. The food may be placed directly in the fryer 4, on the bottom of the wire netting 5, or as stated above, an inner bottom 8, may be placed in the fryer 4 and on this the food may be deposited. In either case the fryer 4 is then lifted by its handles 6 and when the lard or other grease is boiling in the pan 1, the fryer is then deposited within the pan 1, so that the boiling grease will cook the food contained in the fryer.

It will be understood that as the covers are adapted to hold the food below the hot fat, it will be unnecessary to turn the food, and that the food will be just as brown on top as on the under side.

Having thus described my invention, I claim as new and desire to secure by Letters Patent:

1. In a cooking utensil, a pan adapted to contain grease, perpendicular and lateral members secured to the pan, a fryer which is adapted to be disposed in the pan, there being openings in the fryer to permit of communication with the contents of the pan, handles pivoted to the fryer, each of the handles having an opening therein, and fryer cover members secured to the handles, the handles being adapted to be disposed each around one of the perpendicular members on the pan and to lie on the said lateral members.

2. In a cooking utensil, a pan adapted for containing grease, perpendicular and lateral members secured to the pan, a fryer which is adapted to be disposed in the pan, there being openings in the fryer to permit of communication with the contents of the pan when thus disposed, handles pivoted to the fryer, each of the handles having an opening therein, and fryer covers secured to the handles at a distance from their pivoted portions, the handles being adapted to be disposed each around one of the perpendicular members on the pan and to lie against the said lateral members.

3. In a cooking utensil, a pan adapted for containing grease, a fryer disposed in the pan, there being openings in the fryer to permit of communication with the contents of the pan when so disposed, handles pivoted to the fryer, fryer covers secured to the handles intermediate of their terminals respectively, and means co-acting with the handles by which the fryer may be suspended over the pan.

4. In a cooking utensil, a pan adapted for containing grease, a fryer disposed in the pan, there being openings in the fryer to permit of communication with the contents of the pan when so disposed, handles pivoted to the fryer, fryer covers secured to the handles intermediate of their terminals respectively, and means co-acting with the handles by which the fryer may be suspended over the pan with the fryer covers raised.

In testimony whereof I have signed my name to this specification in the presence of two subscribing witnesses.

JACOB RENNER.

Witnesses:
E. C. STEVENSON,
J. F. HUTCHISON.